July 8, 1952  J. S. M. HARRISON ET AL  2,602,184
FISH CLEANING MACHINE
Filed March 13, 1950
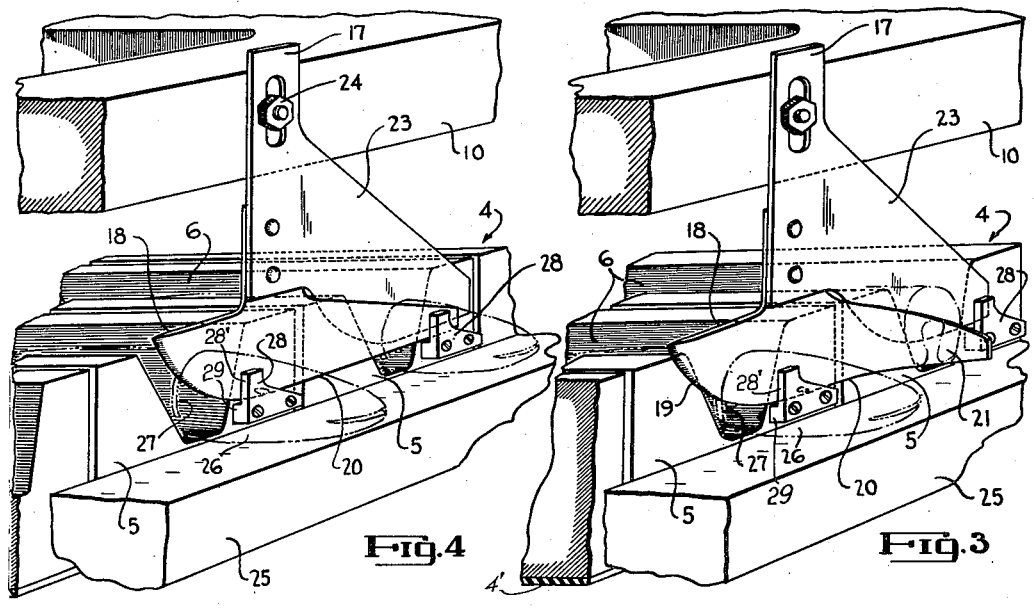
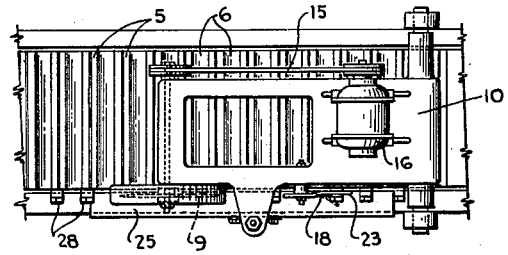
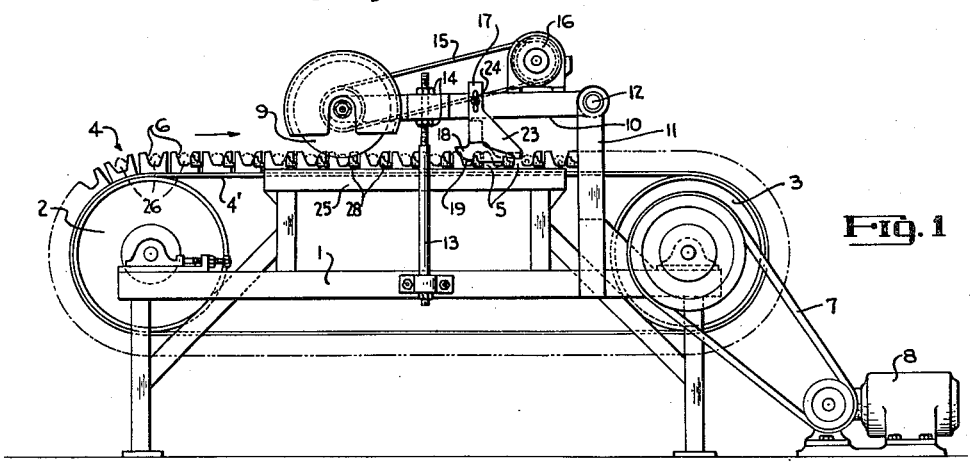
INVENTOR.
John S. M. Harrison and Stewart W. Roach
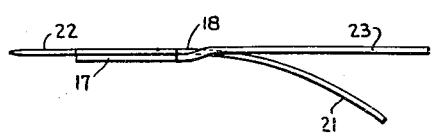
BY
Alex E. MacRae
Attorney.

Patented July 8, 1952

2,602,184

UNITED STATES PATENT OFFICE 2,602,184

FISH CLEANING MACHINE

John S. M. Harrison and Stewart W. Roach, North Vancouver, British Columbia, Canada, assignors to Canadian Patents and Development Limited, Ottawa, Ontario, Canada, a Canadian company Application March 13, 1950, Serial No. 149,254

4 Claims. (Cl. 17—3)

This invention relates to the evisceration of fish, and more particularly to a method and device for removing the head and viscera of fish and especially of small fish, such as anchovies and herring.

Many fish cleaning devices have heretofore been proposed but such prior devices are usually subject to disadvantages. One such disadvantage is that, during the step of removing the head and entrails from the fish, the remaining part of the fish becomes bruised and crushed. Another disadvantage is that the means for removing the head and entrails often results in a breaking or shearing of the entrails, leaving a portion of the same in the fish. Moreover, the structure of prior machines is frequently cumbersome and complicated, and therefore impractical for commercial use.

An object of the present invention is to provide an efficient method and apparatus for removing the head and entrails of fish, the apparatus being of simple, convenient and inexpensive manufacture and being of satisfactory and positive operation.

To this end, the invention contemplates a method which comprises the steps of making a transverse cut of predetermined depth through the backbone and nape of a fish while leaving unsevered the lower portion of the fish below the nape and intermediate entrails, and thereafter subjecting the head of the fish to a sharp outward movement in a direction substantially parallel to the longitudinal axis of the fish to sever said lower portion and remove the head and entrails.

The invention also contemplates the provision of apparatus having spring means for removing the head and entrails of fish in a direction substantially parallel to the longitudinal axis or backbone of the fish, and including simple automatic means for successively tensioning and releasing the spring means.

The invention will be described with reference to the accompanying drawing, in which, Figure 1 is a side elevation of a machine in accordance with the invention, Figure 2 is a partial plan view of the machine, Figure 3 is an enlarged perspective view of a portion of the machine, Figure 4 is a view, similar to Figure 3, but with the parts thereof in somewhat different position, and Figure 5 is a plan view of a retainer plate and spring means.

In the drawing, 1 is a frame in which are mounted a pair of sprockets 2 and 3 supporting an endless conveyor 4 comprising a belt 4' having fixed thereon a plurality of conveyor blocks 5. Each block 5 has a transversely extending fish receiving and holding groove 6. Sprocket 3 is driven by any suitable means, such as by a belt 7 from motor 8.

A rotary knife consisting of a circular or disclike blade 9 is journalled in an auxiliary frame 10. Blade 9 lies in a vertically disposed plane which is parallel to the direction of travel of conveyor 4 and is positioned laterally of and parallel to the ends of the blocks 5 but closely adjacent thereto. The lowermost or cutting position of the edge of the knife is located laterally of the ends of the blocks 5 and somewhat above the plane of the bottoms of grooves 6.

Suitable means is preferably provided for vertically adjusting the position of the knife 9. As shown, this means may comprise a fixed frame member 11 to which one end of auxiliary frame 10 is pivoted at 12 and a post 13 supporting the other end of frame 10. Frame 10 is vertically movable with respect to post 13 but is fixed in position with respect thereto by means of lock nuts 14. Knife 9 may be driven in any suitable manner as by means of belt 15 from motor 16 mounted on frame 10.

Suspended from frame 10 as by a bracket 17 is a flat spring strip 18 in rearward relation to knife 9 but in longitudinal alignment therewith. Spring 18 may be of spring steel or the like having a thickness of, for instance, .035 inch. Spring 18 has a convexly curved leading edge 19 merging into a substantially horizontal lower edge 20 lying in a plane substantially coincident with that of the lowermost or cutting position of the edge of knife 9. Spring 18 has a tail portion 21, outwardly or laterally curved from the plane of its flat forward portion 22.

Suspended from and, as shown, integral with, bracket 17, is a retainer plate 23 in longitudinal alignment with spring portion 22 and knife 9 and in lateral relation to curved spring portion 21.

Preferably, spring 18 and plate 23 are vertically adjustable as, for instance, by means of an adjustable connection 24 between the bracket 17 and frame 10.

A counter 25 is provided to support the partially severed fish heads prior to removal. Each conveyor block carries a spring tensioning or trigger means comprising an upright plate 28 spaced from the end of the block as by a flange 29 and in approximate longitudinal alignment with the flat portion 22 of the spring 18 to permit knife 9, spring 18, and retainer 23 to pass between trigger means 28 and conveyor block 5. The forward vertically disposed edge 28' of the plate is located approximately laterally opposite the rearward surface of groove 6.

In operation, with the conveyor and knife in motion, the fish 26 are placed in the conveyor blocks with the backs of the fish in uppermost position and with their heads projecting beyond the side of the blocks and supported by the counter 25, as shown. As the fish are conveyed past the knife 9, the latter successively effects a cut 27 in each fish, which cut severs the backbone and nape of the fish, leaving the lower portion of the head and entrails intact with the fish. The fish, with their partially severed heads supported on the counter 25, are now successively conveyed into engagement with the flat forward portion 22 of the spring 18, which enters the cut 27 in the fish. As the conveyor blocks move past the spring 18, the curved tail portion 21 of the latter is successively engaged and disengaged by a plate 28. It will be apparent that, as a result of such engagement, the tail portion 21 will be flattened against retainer plate 23 in longitudinal alignment with flat forward portion 22, as shown in Figures 2 and 4, and will therefore follow portion 22 into the cut 27 in the fish. At the same time, the opposed retainer plate 23 will also enter the cut. Tail portion 21 becomes disengaged with each plate 28 when such portion 21 is completely positioned in the cut 27, as will be apparent, and on such disengagement, the tail portion 21, having been placed under tension, recoils sharply carrying with it the head and attached entrails of the respective fish. The retainer plate 23 retains the body portion of the fish in the groove. The sharp outward movement of the head, in a direction substantially parallel to the axis of the fish, readily severs the remaining portion of the head from the body and ensures that the entire entrails are removed therewith.

What is claimed is:

1. A fish cleaning machine comprising a frame, a knife mounted in normally fixed position in said frame, a conveyor mounted in the frame adjacent and laterally opposite said knife for conveying fish severally into engagement with the knife to partially sever the heads from said fish, spring means for removing said partially severed heads and entrails from the fish including a spring mounted in the frame and having a flat forward portion longitudinally aligned with the knife and an outwardly curved rearward portion, and a plurality of longitudinally aligned spaced members carried by the conveyor, said members successively engaging said rearward portion to place it under tension, said rearward portion being free to recoil on release by each of said members.

2. A fish cleaning machine comprising a frame, a conveyor mounted in the frame for severally moving fish and having fish holding members extending transversely thereof, a rotary knife mounted in the frame adjacent one side of the conveyor and in transversely extending position with respect to said fish holding members for imparting a transverse cut in each fish in succession on said conveyor, a spring plate mounted in the frame rearwardly of said knife and having a flat forward portion in longitudinal alignment with the knife and an outwardly curved tail portion, and means carried by the conveyor for successively engaging said tail portion to place it under tension and disengaging it to permit outward movement thereof, said outward movement being adapted to move the head and entrails from a fish.

3. A fish cleaning machine comprising a frame, an endless conveyor in the frame having transversely extending fish-holding grooves therein, a vertically disposed knife mounted in the frame in adjacent relation to one side of said conveyor and in transversely extending position with respect to said grooves, a vertically disposed plate mounted in the frame rearwardly of said knife and in longitudinal alignment therewith, said plate having a flat forward portion and an outwardly curved resilient rearward portion, and means carried by the conveyor rearwardly of each groove for successively tensioning and releasing said resilient portion.

4. A fish cleaning machine comprising a frame, an endless conveyor in the frame having conveyor blocks thereon, each block having a transversely extending fish-holding groove therein, a vertically disposed circular knife mounted in the frame in slightly spaced relation to one side of the conveyor and disposed in a direction transverse to that of the grooves, the lower edge of said knife lying in a plane spaced above that of the bottom of said grooves, a vertically disposed spring plate suspended from the frame rearwardly of the knife, said plate having a forward flat portion in longitudinal alignment with the knife and an outwardly curved resilient rearward portion, the lower edge of said plate lying in substantially the same plane as the lower edge of said knife, a retainer plate suspended from the frame in longitudinal alignment with the knife and in lateral relation to said rearward portion, and a vertically disposed trigger plate carried by the end of each conveyor block rearwardly of the groove therein, said trigger plate being spaced from the end of the conveyor block and having its inner face lying in a vertical plane substantially coincident with the plane of the outer face of said forward portion of the spring plate, said inner face of the trigger plate being engageable with said rearward portion of the spring plate to place said rearward portion in longitudinal alignment with said forward portion of the spring plate.

JOHN S. M. HARRISON.
STEWART W. ROACH.

REFERENCES CITED

The following references are of record in the file of this patent:

UNITED STATES PATENTS

| Number | Name | Date |
|---|---|---|
| 1,134,530 | Hauber | Apr. 6, 1915 |
| 1,632,200 | Stafford | June 14, 1927 |
| 1,642,442 | Hovden | Sept. 13, 1927 |
| 2,245,329 | Danielsson | June 10, 1941 |